United States Patent
Wostbrock et al.

(10) Patent No.: US 7,105,078 B2
(45) Date of Patent: *Sep. 12, 2006

(54) METHOD FOR PRODUCING AN AQUEOUS HYDROXYLAMINE SOLUTION DEVOID OF SALT

(75) Inventors: Karl-Heinz Wostbrock, Mörstadt (DE); Eckhard Ströfer, Mannheim (DE); Markus Weber, Ludwigshafen (DE); Steffen Kerth, Ludwigshafen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 197 days.

This patent is subject to a terminal disclaimer.

(21) Appl. No.: 10/482,213

(22) PCT Filed: Jul. 2, 2002

(86) PCT No.: PCT/EP02/07273

§ 371 (c)(1),
(2), (4) Date: Dec. 30, 2003

(87) PCT Pub. No.: WO03/004408

PCT Pub. Date: Jan. 16, 2003

(65) Prior Publication Data

US 2004/0149563 A1    Aug. 5, 2004

(30) Foreign Application Priority Data

Jul. 4, 2001    (DE) ................. 101 34 389

(51) Int. Cl.
*B01D 3/34* (2006.01)
*C01B 21/20* (2006.01)
*C07C 51/44* (2006.01)

(52) U.S. Cl. ............. 203/14; 203/36; 203/37; 203/99; 203/DIG. 19; 423/387

(58) Field of Classification Search ............... 203/1–3, 203/14, 36, 37, 99, DIG. 19, 100; 202/158; 423/387

See application file for complete search history.

(56) References Cited

U.S. PATENT DOCUMENTS

| | | | |
|---|---|---|---|
| 3,721,850 A | 3/1973 | Giller | |
| 4,956,168 A * | 9/1990 | Wagaman | 423/386 |
| 5,472,679 A | 12/1995 | Levinthal et al. | |
| 5,837,107 A * | 11/1998 | Watzenberger et al. | 203/78 |
| 6,059,934 A * | 5/2000 | Stober et al. | 203/40 |
| 6,153,799 A | 11/2000 | Watzenberger et al. | |
| 6,254,735 B1 | 7/2001 | Watzenberger | |
| 6,299,734 B1 | 10/2001 | Watzenberger et al. | |
| 6,427,985 B1 * | 8/2002 | Kaibel et al. | 261/112.2 |

FOREIGN PATENT DOCUMENTS

| | | | |
|---|---|---|---|
| DE | 1 954 775 | | 5/1970 |
| DE | 3 528 463 | * | 2/1987 |
| WO | 97/22551 | | 6/1997 |
| WO | 98/57886 | | 12/1998 |
| WO | 99/07637 | | 2/1999 |

OTHER PUBLICATIONS

Gefaehrliche Chemische Reaktionen 25, Stoffinformationen, Hydroxylamin, 1984.

* cited by examiner

*Primary Examiner*—Virginia Manoharan
(74) *Attorney, Agent, or Firm*—Novak Druce & Quigg, LLP

(57) ABSTRACT

A process for preparing a salt-free aqueous hydroxylamine solution by reacting an aqueous solution of a hydroxylammonium salt with a base to give a mixture and separating from said mixture by distillation a salt-free aqueous hydroxylamine solution, involving using as a base an aqueous solution of a mixture of NaOH and KOH in a molar ratio $Na^+:K^+$ in the range from 70:30 to 95:5 and with a total concentration of $Na^+$ and $K^+$ in the range from 0.1 to 10 m/m % based on the total amount of the mixture.

14 Claims, No Drawings

METHOD FOR PRODUCING AN AQUEOUS HYDROXYLAMINE SOLUTION DEVOID OF SALT

The present invention relates to a process for preparing a salt-free aqueous hydroxylamine solution by reacting an aqueous solution of a hydroxylammonium salt with a base to give a mixture and separating from said mixture by distillation a salt-free aqueous hydroxylamine solution, which comprises using as a base an aqueous solution of a mixture of NaOH and KOH in a molar ratio $Na^+$:$K^+$ in the range from 70:30 to 95:5 and with a total concentration of $Na^+$ and $K^+$ in the range from 0.1 to 10 m/m % based on the total amount of the mixture.

High-purity concentrated aqueous hydroxylamine solutions are used inter alia in the electronics industry, in conjunction for example with other substances for cleaning printed circuit boards or silicon wafers. For use in the electronics industry, concentrations of impurities—metal ions in particular—of well below 1 ppm are normally required, i.e., electronic grade product. The purity requirements imposed on the aqueous hydroxylamine solutions are increasing continually.

Industrially, hydroxylamine is produced as a hydroxylammonium salt, normally as hydroxylammonium sulfate. To prepare salt-free aqueous hydroxylamine solutions, a base is added to an aqueous solution of a hydroxylammonium salt and an aqueous hydroxylamine solution is separated from the mixture, normally by distillation, in accordance for example with U.S. Pat. No. 5,472,679, WO 97/22551, WO 98/57886, DE 1954775.8, WO 99/07637.

The distillation of aqueous solutions containing hydroxylamine, even on a laboratory scale, is regarded as a particularly hazardous operation: see Roth-Weller: Gefährliche Chemische Reaktionen, Stoffinformationen Hydroxylamin, page 3, 1984, 2, Eco-med-Verlag.

Accordingly, the aforementioned distillation necessitates a high level of technical complexity and a large amount of time.

Moreover, despite the distillation, aqueous hydroxylamine solutions contain impurities from their preparation, such as sodium sulfate or other metal compounds, in undesiredly large amounts.

It is an object of the present invention to provide a process for preparing salt-free aqueous hydroxylamine solutions by distillation wherein the aqueous hydroxylamine solutions are obtained with a low level of impurities without any increase in technical complexity, time or safety risk.

We have found that this object is achieved by the process defined at the outset.

The process of the invention uses an aqueous solution of a hydroxylammonium salt and of a base. The solution may contain further substances without deleterious effect on the process of the invention, such as hydroxylamine, or stabilizer, such as 1,2-trans-(N,N,N',N'-tetraacetic acid)-cyclohexanediamine or its salts, sodium or ammonium salts for example, or the stabilizers described in WO 97/22551.

Suitable hydroxylammonium salts include salts of organic acids, such as formic acid, acetic acid, preferably salts of inorganic acids, such as sulfuric acid, phosphoric acid, hydrochloric acid, or mixtures of such salts.

These hydroxylammonium salts and their preparation are known per se.

To prepare the solution of a hydroxylammonium salt and of a base, the hydroxylammonium salts may be used advantageously in the form of aqueous solutions having a hydroxylammonium salt content of from 5 to 50 m/m %, in particular from 26 to 38 m/m %.

In accordance with the invention, the base used comprises an aqueous solution of a mixture of NaOH and KOH in a molar ratio $Na^+$:$K^+$ in the range from 70:30 to 95:5, preferably from 80:20 to 90:10, in particular from 84:16 to 86:14. A suitable total concentration of $Na^+$ and $K^+$ is in the range from 0.1 to 10 m/m %, preferably from 2.0 to 4.6 m/m %, and in particular from 4.1 to 4.3 m/m %, based on the total amount of the mixture.

This mixture may comprise further oxides or hydroxides of the alkali metals, such as lithium hydroxide, of the alkaline earth metals, such as calcium hydroxide, strontium hydroxide, barium hydroxide, ammonia, amines, such as monoamines, diamines or triamines, examples being methylamine, dimethylamine, trimethylamine, ethylamine, diethylamine, triethylamine, mono-, di- or trialkanolamines, such as diethanolamine, and cyclic amines, such as pyrrolidine or piperidine, and also mixtures of such bases. Advantageously, the mixture contains no further such compounds.

The base may be used advantageously in the form of an aqueous solution, preferably at a concentration of from 25 to 60 m/m %, in particular from 45 to 50 m/m %.

The amount of base should be chosen so that the hydroxylammonium salt is converted completely or at least predominantly into free hydroxylamine. This can be done continuously or batchwise and at temperatures in the range from about 10° C. to 120° C.

The aqueous solution of a hydroxylammonium salt and of a base that is used in the process of the invention should have a hydroxylamine content of from 2 to 45 m/m %, preferably from 8 to 12 m/m %.

The base may be added during the distillation. It is advantageous to add the base prior to the distillation.

The addition may be made continuously or batchwise and at temperatures in the range between the melting point of the hydroxylammonium salt solution and its boiling point, advantageously from about 0° C. to 100° C. Depending on the nature and concentration of the hydroxylammonium salt and on the reaction conditions employed for the liberation, such as the temperature at which the reaction is conducted, some of the salt formed from the base cation and the acid anion present in the hydroxylammonium salt may undergo precipitation. If desired, the solution may also be cooled in order to precipitate a larger amount of the salt. The reaction conditions and concentrations should advantageously be chosen so that no salt is precipitated.

For the distillation for preparing the salt-free aqueous hydroxylamine solution it is possible to contemplate customary single-stage or multistage apparatus (stripping columns), such as are described, for example, in Kirk-Othmer, Encyclopedia of Chemical Technology, 3rd. Ed., Vol. 7, John Wiley & Sons, New York, 1979, pages 870–881, such as evaporation chambers or rectifying columns, examples being sieve tray columns, bubblecap tray columns, orderedly packed columns or randomly packed columns.

Single-stage distillation chambers, pure stripping columns or rectifying columns with stripping and enriching sections may be used here.

Suitable ordered or random packings include conventional packings of this kind, such as Raschig rings, Pall rings, and saddles.

The columns advantageously have a theoretical plate number in the range from 5 to 70. The reaction mixture, to which a stabilizer may have been added, may be supplied directly to the top of the column (top section of the packing or topmost tray).

In the stripping column, the solution is fractionated in such a way that the salt fraction is taken off at the bottom of the column and an aqueous hydroxylamine fraction is taken off at the level of the feed tray or above, in particular from the column top. In order to achieve this it is preferred to treat the solution by passing steam and/or water into the column bottom in countercurrent. At a hydroxylamine concentration in the feed solution in the range from 2 to 45 m/m %, the volume flow of water or steam is generally from 1 to 8 times, in particular from 1 to 5 times, the amount of feed.

The temperature of the steam introduced is generally in the range from 80 to 180° C. If desired, it is also possible to heat the column bottom as well. The temperatures prevailing at the column top depend on the pressure at which the column is operated. This pressure is generally from 5 to 300 kPa, preferably from 50 to 300 kPa. With particular preference, the column may be operated at a pressure in the range from 50 to 150 kPa. This pressure refers to the pressure at the top of the tray column.

The temperatures at the column top are, accordingly, generally in the range from 80 to 130° C., preferably from 90 to 120° C. The temperature of the steam that is introduced may be significantly higher, even 150° C., for example. Advantageously, however, it should not be so high that too much water is evaporated from the salt solution and the salt begins to precipitate in the column bottom.

If desired, a droplet separator (demister) may be installed above the feed tray or in the vapor takeoff in such a way that entrainment of the salt by droplets is prevented.

In one advantageous embodiment, the salt-free aqueous hydroxylamine solution may be prepared by distillation in a tray column having at least 2 actual trays.

Advantageously, the column should have an actual tray number in the range from 10 to 60. Suitable trays include crossflow trays such as sieve trays, valve trays, bubble cap trays and tunnel trays, or dual-flow trays, preferably sieve trays. The distance between trays should be in the range from 200 to 900 mm, preferably from 300 to 600 mm.

The column and trays may be manufactured from nonmetallic materials, such as glass, ceramic, plastics. This prevents the decomposition initiated by metal ions. Surprisingly, however, it has been found that the column may also be manufactured from specific metallic materials, such as platinum, silver, zirconium, without any significant increase in the level of hydroxylamine decomposition observed.

The return ratio in the rectifying section may advantageously be regulated in such a way that it lies within the range from 0.2 to 2.

In accordance with the invention, located above at least one tray of the tray column, over the cross section of the column, are conventional random packings such as Raschig rings, Pall rings, saddles, modern high-performance random packings such as the Hiflow ring (from Rauschert (Steinwiesen, Germany)), Super-Raschig rings (from Raschig (Ludwigshafen, Germany)), Cascade-Mini rings (from Koch-Glitsch (Wichita, USA)), IMTP rings (from Norton (Akron, USA)) or Nutter rings (from Sulzer Chemtech (Wintherthur, Switzerland)) or structured packings such as Mellapak, Mellapak Plus or woven packings, preferably modern high-performance packings.

The packings should be inert toward the solution to be distilled, consisting for example of plastics or special metallic materials, preferably of perfluorinated polymers (e.g., TFM, PFA, Teflon).

The fill level of the packings between the trays should be from 50 to 300 mm, preferably from 100 mm to 200 mm. The distance between the bed of packings and the tray above which the bed of packings is installed is between 0 and 600 mm, preferably from 100 mm to 300 mm. The distance between the bed of packings and the tray below which the bed of packings is installed is from 0 to 300 mm, preferably from 30 to 100 mm.

The pressure in the tray column is generally from 5 to 200 kPa, preferably from 10 to 110 kPa. It is particularly preferred to operate the tray column at a pressure in the range from 50 to 110 kPa and in particular under atmospheric pressure. This pressure relates to the pressure at the top of the tray column.

The temperatures prevailing in the tray column depend on the pressure at which the tray column is operated. They are generally in the range from 30 to 130° C., preferably from 80 to 130° C.

The energy required for distillation may advantageously be supplied by introducing steam in the bottom region. The temperature of this introduced steam should generally be in the range from 80 to 180° C.

The aqueous solution of a hydroxylammonium salt and of a base that is used in the process of the invention may be supplied at the top of the tray column, at one of the upper trays or, advantageously, at one of the middle trays. If desired, a device for separating entrained droplets, such as a demister, may be installed above the feed tray.

The bottom product obtained in the process of the invention is an aqueous solution comprising a salt of the anion of the hydroxylammonium salt and the cation of the base.

In one preferred embodiment, the tray column used may be a side offtake column.

In this case, the salt-free aqueous hydroxylamine solution is withdrawn at the side offtake. Water is then generally obtained at the top of the column.

The salt-free aqueous hydroxylamine solution obtained in accordance with the invention generally has a hydroxylamine content of from 1 to 20 m/m %, preferably from 8 to 12 m/m %.

The salt-free aqueous hydroxylamine solution obtained by the process of the invention has a greater purity than a solution obtained by known distillation methods. Moreover, the residence time of the distillation mixture in the column is shorter, and hence the thermal load is lower, than with known methods. Additionally, for a given column size and the same column holdup, the capacity of the column is increased. If the column includes a demister, the demister is unburdened relative to a known method.

The hydroxylamine solution obtained may, if desired, be concentrated in a distillation column. It may be advantageous to add a stabilizer prior to the distillation. The hydroxylamine solution may be fed in advantageously at a height of approximately one third of the actual tray number of the distillation column. At the column top, substantially hydroxylamine-free water is obtained and at the bottom a hydroxylamine solution whose concentration is dependent on the distillation conditions.

In general, the distillation column is operated with a pressure in the range from 1 to 200 kPa (from 0.01 to 2 bar), preferably from 5 to 120 kPa (from 0.05 to 1.2 bar), with particular preference from 30 to 110 kPa (from 0.3 to 1.1 bar), the pressure referring in each case to the pressure at the top of the column. The greater the extent to which the hydroxylamine is to be concentrated, the more gentle (low pressure and low temperature) the distillation must be. The distillation may take place continuously or batchwise.

The temperatures prevailing in the distillation column are dependent on the pressure at which the distillation column is operated. They are generally in the range from 10 to 160° C., preferably from 60 to 120° C.

The water or vapors taken off at the top of the distillation column may be recycled to the bottom of the column used in the process of the invention, directly or following compression or superheating as stripping steam, or may be supplied as waste water to a waste water treatment facility.

If desired, a device for deposition of entrained droplets, such as a demister, may be installed above the feed tray.

As the distillation column it is possible to use conventional columns in a conventional manner. As the distillation column it is advantageous to use a tray column having at least two trays.

The column should advantageously have an actual tray number in the range from 4 to 50. Suitable trays include crossflow trays such as sieve trays, valve trays, bubble cap trays and tunnel trays or dual-flow trays, preferably sieve trays. The distance between these trays should be in the range from 200 to 900 mm, preferably from 300 to 600 mm.

The column and trays may be manufactured from nonmetallic materials, such as glass, ceramic, plastics. This prevents the decomposition initiated by metal ions. Surprisingly, however, it has been found that the column may also be manufactured from specific metallic materials, such as platinum, silver, zirconium, without a significant increase in hydroxylamine decomposition being observed.

Advantageously, a falling film evaporator is used to heat the column bottoms, although it is of course also possible to use other customary bottoms heaters, such as natural-circulation or forced-circulation evaporators, plate-type heat exchangers, etc.

The return ratio in the rectifying section may advantageously be regulated in such a way that it lies within the range from 0.2 to 2.

In accordance with the invention, located above at least one tray of the tray column, over the cross section of the column, are conventional random packings such as Raschig rings, Pall rings, saddles, modern high-performance random packings such as the Hiflow ring (from Rauschert (Steinwiesen, Germany)), Super-Raschig rings (from Raschig (Ludwigshafen, Germany)), Cascade-Mini rings (from Koch-Glitsch (Wichita, USA)), IMTP rings (from Norton (Akron, USA) or Nutter rings (from Sulzer Chemtech (Wintherthur, Switzerland)) or structured packings such as Mellapak, Mellapak Plus or woven packings, preferably modern high-performance packings.

The packings should be inert toward the solution to be distilled, consisting for example of plastics or special metallic materials, preferably of perfluorinated polymers (e.g., TFM, PFA, Teflon).

The fill level of the packings between the trays should be from 50 to 300 mm, preferably from 100 mm to 200 mm. The distance between the bed of packings and the tray above which the bed of packings is installed is between 0 and 600 mm, preferably from 100 mm to 300 mm. The distance between the bed of packings and the tray below which the bed of packings is installed is from 0 to 300 mm, preferably from 30 to 100 mm.

The concentrated aqueous hydroxylamine solution, which preferably has a hydroxylamine content in the range from 20 to 60 m/m %, is generally obtained as the bottom product.

EXAMPLE

A hydroxylammonium sulfate solution (32 m/m %; about 0.6 kg/h) was admixed with sodium hydroxide/potassium hydroxide (each 50 m/m %; about 1.7 kg/h) in different proportions, according to Table 1, with hydroxylamine, sodium sulfate and potassium sulfate being liberated. In a laboratory column, a hydroxylamine solution was stripped off from this salt solution, at the top, with a constant amount of steam. The solution was analyzed for $Na^+$ and $K^+$ ions.

The result is summarized in Table 1 below.

TABLE 1

| NaOH/KOH [m/m] | $Na^+$ [mg/kg] in hydroxylamine solution | $K^+$ [mg/kg] in hydroxylamine solution |
|---|---|---|
| 100:0 | 2.5 | 0 |
| 90:10 | 1.7 | 0.2 |
| 80:20 | 1 | 0.4 |

The contamination of the HA solution by metal ions is surprisingly reduced by neutralization with a mixture of potassium hydroxide and sodium hydroxide, so that the $Na^+$ contamination can be reduced to 40%. The ponderal sum of $Na^+$ and $K^+$ ions was reduced to 57%.

We claim:

1. A process for preparing a salt-free aqueous hydroxylamine solution which comprises reacting an aqueous solution of a hydroxylammonium salt with a base to give a mixture and separating from said mixture by distillation a salt-free aqueous hydroxylamine solution, wherein the base is an aqueous solution of a mixture of NaOH and KOH in a molar ratio $Na^+$:$K^+$ in the range from 70:30 to 95:5 with a total concentration of $Na^+$ and $K^+$ in the range from 0.1 to 10 m/m % based on the total amount of the mixture.

2. A process as claimed in claim 1, wherein the mixture contains NaOH and KOH in a molar ratio $Na^+$:$K^+$ in the range from 80:20 to 90:10.

3. A process as claimed in claim 1, wherein the total concentration of $Na^+$ and $K^+$ is in the range from 2.0 to 4.6 m/m % based on the total amount of the mixture.

4. A process as claimed in claim 1, wherein the distillation is conducted in a tray column having at least 10 actual trays.

5. A process as claimed in claim 4, wherein random or structured packings are located above at least one tray of the tray column over the cross section of the column.

6. A process as claimed in claim 5, wherein the tray column has from 10 to 80 actual trays.

7. A process as claimed in claim 5, wherein packing elements used comprise random packings, high-performance random packings or structured packings.

8. A process as claimed in claim 5, wherein packing elements used comprise conventional random packings, selected from the group consisting of Raschig rings, Pall rings, and saddles.

9. A process as claimed in claim 5, wherein packing elements used comprise:
   conventional random packings selected from the group consisting of Raschig rings, Pall rings and saddles;
   high-performance random packings; or
   structured packings.

10. A process as claimed in claim 4, wherein the temperature in the tray column is in the range from 80° C. to 130° C.

11. A process as claimed in claim 4, wherein the tray column is a side offtake column.

12. A process as claimed in claim 11, wherein the salt-free aqueous hydroxylamine solution is obtained at the side offtake.

13. A process as claimed in claim 11, wherein water is obtained as the column top product.

14. A process as claimed in claim 1, wherein the distillation bottom product is an aqueous solution comprising a salt of the anion of the hydroxylammonium salt and the cation of the base.

* * * * *